UNITED STATES PATENT OFFICE

2,516,585
SYNTHETIC LINEAR POLYAMIDES CONTAINING INTRALINEAR CYCLIC GROUPS AND PROCESS FOR OBTAINING SAME

Donald C. Pease, Wilmington, Del., assignor to E. I. du Pont de Nemours & Company, Wilmington, Del., a corporation of Delaware No Drawing. Application December 21, 1948, Serial No. 66,577

3 Claims. (Cl. 260—78)

This invention relates to condensation polymers, and more particularly to a new synthetic linear polyamide.

Synthetic linear polyamides are usually prepared by condensation of substantially equimolecular amounts of a diamine and a dicarboxylic acid, or by the self-condensation of relatively long chain amino acids, polyhexamethyleneadipamide and poly-omega-aminocaproamide being respectively, examples of these two types. These polymers have a high degree of crystallinity and are opaque. They have a sharp melting point (e. g., generally about 240° C.). Copolyamides prepared from mixtures of diamines and/or of dibasic acids, e. g., that from hexamethylenediamine, adipic acid and sebacic acids are known to be more transparent and to have a wider and lower softening range; however, special quenching methods or additives are necessary with most copolyamides to obtain clear products, particularly in the form of moldings as contrasted to the fiber forms. For many applications, particularly in the molded or massive state, increased stiffness of molded products and further increased softening point over currently available polyamides could be of value where polymeric materials may be employed.

This invention has as an object the production of new and valuable polymeric materials. A further object is a new type of polyamide which is characterized by high clarity, transparency, and stiffness, which is water insensitive, and which possesses a high softening point. A further object is a polyamide of this kind which can be obtained without the use of special additives or quenching methods. Further objects reside in methods for obtaining these polyamides. Other objects will appear hereinafter.

I have discovered that polyamides having the desirable combination of properties mentioned above can be obtained by condensing terephthalic acid at polymerizing temperature with bis(4-amino-3-methylcyclohexyl)methane. The terephthalic acid can be used as such but, as in the manufacture of polyamides generally from dibasic acids, it is usually more convenient to use the acid in the form of its amide-forming derivative. In either instance, the new polyamides described herein are characterized by recurring units of the formula

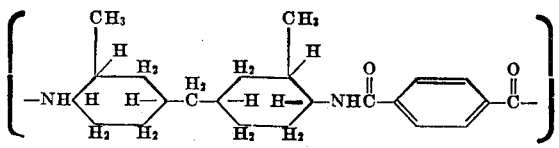

The invention is illustrated in greater detail in the following examples, in which parts are by weight.

Example I

To 313.3 parts of bis(4-amino-3-methylcyclohexyl)methane in a glass-lined pressure resistant reactor was added 421 parts of diphenyl terephthalate. The reactor was purged with oxygen-free nitrogen, sealed and heated for one hour at 210° C. under autogenous pressure. The reactor was opened and heated under one atmosphere pressure of nitrogen for ½ hour at 330° C., allowing the phenol from the condensation reaction to distill out. The reaction was completed under a pressure of 5 mm. of mercury for ¼ hour at 330° C. The polymer obtained softened at 300° C. Transparent, nearly colorless films were obtained by heating this polymer under 2000-3000 lbs./sq. in. at 330° C. The film had a stiffness of 300,000 lbs./sq. in. either at 25° C. and 50% R. H. or after soaking in water at 25° C. for 72 hours.

Example II

To 174.3 parts of bis(4-amino-3-methylcyclohexyl)methane in a glass-lined reactor was added 234.6 parts of diphenyl terephthalate. The reactor was purged with oxygen-free nitrogen and heated under an atmospheric pressure of nitrogen at 210-225° C. until the contents melted. The temperature was rapidly raised to 330° C. and maintained under one atmosphere pressure of nitrogen for 10 minutes and under a pressure of 2 mm. of mercury for 15 minutes. The polymer thus obtained had an inherent viscosity of 0.54 (the 1n relative viscosity of 0.5% solution in m-cresol at 25° C. divided by 0.5). The particle size of the polymer was reduced sufficiently to pass a ¼" screen and it was heated ¾ of an hour at 306° C. under a pressure of 1.5 mm. of mercury. The inherent viscosity was thereby increased to 1.05.

A bar of this polymer which was injection molded at 325° C. was transparent and had a stiffness of 160,000 lbs./sq. in. at 175° C. compared with 40,000 lbs./sq. in. for the polyamide from adipic acid and hexamethylenediamine at the same temperature.

Example III

To 751.5 parts of bis(4-amino-3-methylcyclohexyl)methane in a glass-lined reactor was added 1002.5 parts of diphenyl terephthalate. The reactor was purged with oxygen-free nitrogen and under one atmosphere pressure of nitrogen it was heated to 250° C. for 10 minutes to melt the contents. The temperature was raised quickly to 310° C. and held for 10 minutes at one atmosphere pressure of nitrogen and for 15 minutes at a pressure of 1.5 mm. of mercury. The particle size of the resulting polymer was reduced to pass a ¼" screen and the polymer was heated at 250° C. for 3 hours under a pressure of 2 mm. of mercury. Transparent, nearly colorless films were obtained by heating this polymer to 310° C. under 2000–3000 lbs./sq. in. pressure. At 25° C. this film had a stiffness of 380,000 lbs./sq. in. and at 200° C. of 180,000 lbs./sq. in.

The bis(4-amino-3-methylcyclohexyl)methane is obtained by the hydrogenation of bis(4-amino-3-methylphenyl)methane. The procedure by which the latter compound was prepared in the present instance was as follows:

To a reactor equipped with a stirrer, a thermometer located near the bottom, a reflux condenser, and a tube for admitting a slow current of oxygen-free nitrogen was added 490 parts of freshly distilled o-toluidine. A solution of 665 parts hydrochloric acid (37%) and 560 parts of water was added with stirring at such a rate that the temperature did not exceed 40° C. The resulting solution was cooled to 0–5° C. and 166 parts of formaldehyde (37%-aqueous) was added with cooling and stirring to maintain the temperature at 0–5° C. The mixture was held at 0–5° C. for one hour and then in the course of an hour warmed with stirring to 45° C. Heating was increased to bring the temperature to 80–90° C. which was maintained for 15 hours with gentle stirring. While still hot, a solution of 280 parts of sodium hydroxide in 800 parts of water was added with stirring. A white crystalline solid separated which on cooling was filtered and washed with water. The crystalline material was transferred to a pot still and 5 parts of powdered sodium hydroxide added. The bis(4-amino-3-methylphenyl)methane which boiled at 222–225° C. under 2.8–3.1 mm. of mercury pressure was collected. This diamine melted at 145–153° C. and the yield was 83% based on the formaldehyde.

A portion of the distilled diamine was crystallized twice from the minimum amount of 95% ethanol and twice more from the minimum amount of chloroform. It melted at 153–154.5° C. (uncorrected) and had the following analysis:

Calc'd for $C_{15}H_{18}N_2$: C, 79.60; H, 8.02; N, 12.38. Found: C, 79.25; H, 7.79; N, 12.24.

The hydrogenation of the bis(4-amino-3-methylphenyl)methane to bis(4-amino-3-methylcyclohexyl)methane, which may also be referred to as 4,4'-methylenebis(2-methylcyclohexylamine), can be carried out as a batch or continuous process under a wide range of conditions. Ruthenium dioxide is particularly useful as the catalyst, but cobalt catalyst can also be used. In general the temperature should be between 75 and 200° C., and is generally 100–125° C. under at least 100 lbs./sq. in. pressure of hydrogen. The time and temperature are interdependent variables and are also dependent upon the specific catalyst. The specific isomer content of the hydrogenated product is subject to variation, particularly by changes in the conditions of hydrogenation. The procedure used in preparing the bis(4-amino-3-methylcyclohexyl)-methane used in the foregoing examples was as follows:

A mixture of 1250 parts of bis(4-amino-3-methylphenyl)methane, 3125 parts of dioxane (purified by distillation over sodium) and 25 parts of finely divided ruthenium dioxide was placed in an autoclave and subjected with stirring to a hydrogen pressure of 2000–3000 lbs./sq. in. at a temperature of 120–125° C. for 4½ hours. The reactor was opened, the contents discharged, and the solution filtered through a layer of Filter-cel (diatomaceous filter aid) to remove catalyst.

From the filtrate there was isolated by distillation bis(4-amino-3-methylcyclohexyl)methane as a clear colorless liquid in a yield of 84.5%. This diamine boiled at 145.5° C. under a pressure of 2 mm. of mercury and had a neutral equivalent of 119.5 (theory 119.2) and $n_D^{25}$ 1.4997.

As previously indicated the present polyamides are obtained from terephthalic acid or from any of its amide-forming derivatives. Of the latter the esters, and particularly the aryl and alkyl hydrocarbon esters such as diphenyl and diisobutyl terephthalate are most advantageously used because they are easily purified, and the difficulties encountered in the purification of the acid are thus avoided. Other amide-forming derivatives can, however, be used if desired, for example, the anhydride, amides, halides, carbamates, N-formal derivatives, and in the presence of water, the nitrile, cyanocarboxylic acid, cyanamides, and cyclic amides.

The present polyamides, although they may be desirably modified for some purposes by the inclusion in the reaction mixture of other polymer forming materials, will consist in major amount, and usually wholly or essentially, of the condensation product of terephthalic acid and bis(4-amino-3-methylcyclohexyl)methane. The polyamides upon hydrolysis in aqueous hydrochloric acid give terephthalic acid and bis(4-amino-3-methylcyclohexyl)methane hydrochloride. A copolymer having properties similar to the polymers described in the examples is obtained by including a minor amount, namely from 5% to 25%, of isophthalic acid in the reaction mixture.

In carrying out the condensation reaction the terephthalic acid or suitable amide-forming derivative and the bis(4-amino-3-methylcyclohexyl)methane are heated in substantially molar ratios, that is in molar ratios that do not depart more than about 0.5% from equimolecular amounts, a slight excess of one of the reactants may be present to control the molecular weight, within desired limits. Generally the acid ester is employed for this purpose and in an amount in excess of about 0.2 to 0.5% on a molar basis. The heating may be carried out at atmospheric, superatmospheric or subatmospheric pressure generally under an inert atmosphere. While the heating may be at any temperature within the range of 100–350° C., optimum rates of polymerization are obtained by heating the amide-forming ingredients to at least 200° C. and preferably in the range of 250–330° C.

The polyamide obtained by the practice of the present invention generally has an inherent viscosity of at least 0.4 and usually between 0.4 and 1.5. The properties of the specific polyamide of this invention are quite unusual as compared to the properties of the conventional polyamides since the new polyamide exhibits a higher softening temperature (300° C. or above); a higher stiffness, particularly at elevated temperatures, e. g., at 175° C. the stiffness of this polyamide is four times the stiffness of polyhexamethyleneadipamide; an increased resistance to moisture, e. g., properties of the wet polymer are substantially the same as for the dry polymer; resistance to oxidative embrittlement, e. g., test bars of the polyamide of this invention were not embrittled after 66 hours exposure to an atmosphere of oxygen at 125° C. whereas bars of polyhexamethylenesebacamide exposed to the same conditions were very friable; and transparency of the polymer.

The polyamides described herein not only have properties that markedly differ from the polyamides most usually used, but they also have properties that differ radically from polyamides obtained from terephthalic acid and compounds that are closely analogous to bis(4-amino-3-methylcyclohexyl)methane. For example, a related polyamide, differing in that the cyclohexyl groups do not have any methyl groups, is not readily fusible and therefrom not capable of being molded, and is not transparent but is opaque. This fact is illustrated by the preparation of a polyamide from terephthalic acid and bis(4-aminocyclohexyl)methane as follows:

To 210.4 parts of bis(p-aminocyclohexyl)methane, which had been prepared by hydrogenating bis(p-aminophenyl)methane over ruthenium dioxide at 145–150° C. and a continuous process, was added 318.3 parts of diphenyl terephthalate. The reactor was purged with oxygen-free nitrogen and was heated under one atmosphere pressure of nitrogen at 250° for 10 minutes to melt the contents. The temperature was raised quickly to 330° C. and held for 10 minutes at an atmosphere pressure of nitrogen and for 15 minutes at 1.5 mm. of mercury. The polymer did not fuse at 330° C. and was opaque.

The novel combination of properties of the polyamides of this invention makes them useful in the preparation of molded objects which are transparent and which are high softening. The additional factors, of high toughness, and stiffness particularly at high humidities and high temperatures permits these polyamides to be used in bristle applications and coating of metal or other surfaces. The polyamide is also useful in electrical applications where rigidity at elevated temperatures and high softening temperatures are required. Molded materials, in view of their transparency, can be used for many applications presently fulfilled by glass. These polymers have increased stability to the adverse effects of heat and light. They are also useful in the preparation of fibers.

As many apparently widely different embodiments of this invention may be made without departing from the spirit and scope thereof, it is to be understood that this invention is not limited to the specific embodiments thereof except as defined in the appended claims.

I claim:

1. A process for making polyamides which comprises heating, in a molar ratio which is within 0.5% of equimolecular amounts, terephthalic acid and bis(4 - amino - 3 - methylcyclohexyl) - methane at a temperature of from 100° C. to 350° C.

2. The process set forth in claim 1 in which said temperature is from 250° C. to 330° C.

3. A polyamide which consists in major amount of recurring structural units of the formula

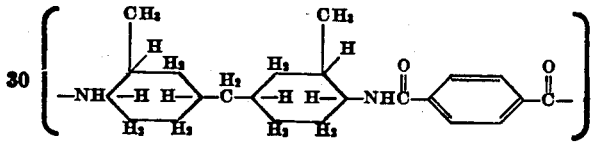

DONALD C. PEASE.

No references cited.

Certificate of Correction

July 25, 1950

Patent No. 2,516,585      DONALD C. PEASE

It is hereby certified that error appears in the printed specification of the above numbered patent requiring correction as follows:

Column 5, line 9, for the word "therefrom" read *therefore*; line 21, for "250°" read *250° C.*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*